Sept. 24, 1957     J. W. JACOBS     2,807,147
VEHICLE REFRIGERATING APPARATUS
Filed Nov. 29, 1954     4 Sheets-Sheet 1

INVENTOR.
James W. Jacobs
BY R. R. Candor
His Attorney

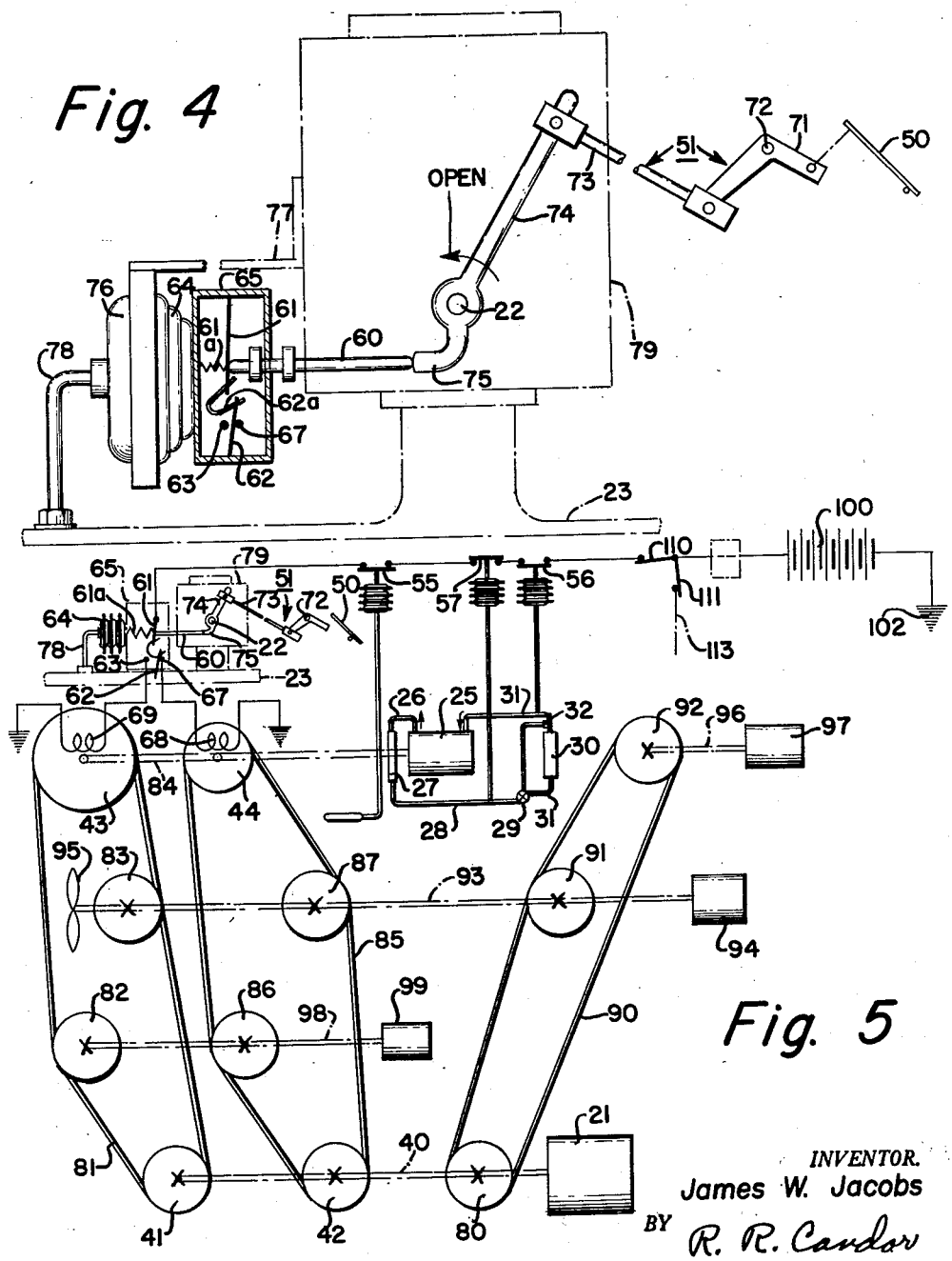

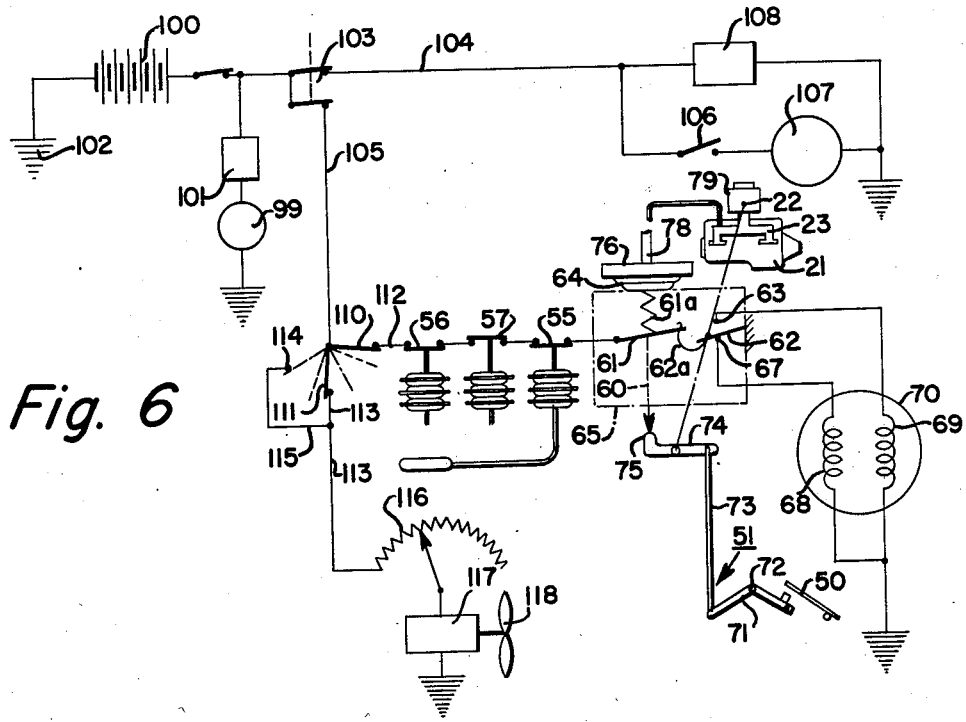
Fig. 6
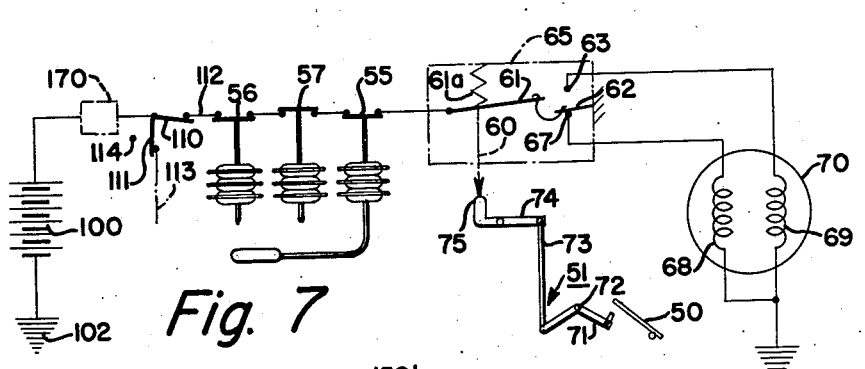
Fig. 7
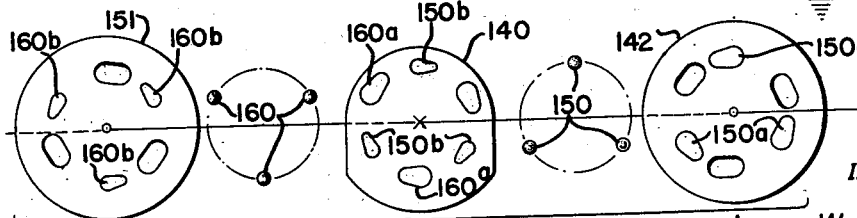
Fig. 2-A

Sept. 24, 1957   J. W. JACOBS   2,807,147
VEHICLE REFRIGERATING APPARATUS
Filed Nov. 29, 1954   4 Sheets-Sheet 4

INVENTOR.
James W. Jacobs
BY R. R. Candor

His Attorney

United States Patent Office 2,807,147
Patented Sept. 24, 1957

2,807,147

VEHICLE REFRIGERATING APPARATUS

James W. Jacobs, Dayton, Ohio, assignor to General Motors Corporation, Detroit, Mich., a corporation of Delaware Application November 29, 1954, Serial No. 471,625

9 Claims. (Cl. 62—4)

This invention relates to refrigerating apparatus and more particularly to a refrigerating apparatus to condition the interior of an automobile or the like.

An object of this invention is to provide an automobile air conditioning system with a compressor driven at a multiple speed ratio and in which the ratio is varied in accordance with the position of the throttle of the engine and/or the suction of the manifold.

Another object of this invention is to provide an air conditioning system in which the compressor is driven from the automobile engine and in which the compressor is driven at a relatively high speed ratio when the throttle is at a position corresponding to a low engine speed and in which the compressor is driven at a relatively low speed ratio when the throttle is at a position corresponding to a high engine speed.

Another object of this invention is to provide a system as in the foregoing object in which the action of the pedal is modified by the pressure in the manifold of the engine.

Another object of this invention is to provide a system in which the compressor ratio speed drive is modified in accordance with the suction manifold of the engine.

Another object is to provide selection of the speed ratio in accordance with a refrigerant condition.

Another object of this invention is to provide a multiple speed clutch which is controlled by two solenoids positioned in the clutch energizing a relative rotation reaction spreader means.

Further objects and advantages of the present invention will be apparent from the following description, reference being had to the accompanying drawings wherein a preferred form of the invention is clearly shown.

In the drawings:

Figure 2A is a diagrammatic representation, in an exploded form, of the relationship of the driving disk and the driven disks and the ball and teardrop constructions between those disks.

Figure 4 is a diagrammatic representation of the throttle and manifold control of the switch which in turn controls the energization of the solenoids.

Figure 5 is a diagrammatic representation of the front of the engine of the automobile and of its belt drives to the compressor and other elements.

Figure 6 is a wiring diagram of the controls for the systems shown in Figures 1 to 5.

Figure 7 is a wiring diagram of a portion of Figure 6 slightly modified and showing a control in which only the throttle controls the energization of the clutch.

Figures 1, 2, 3:
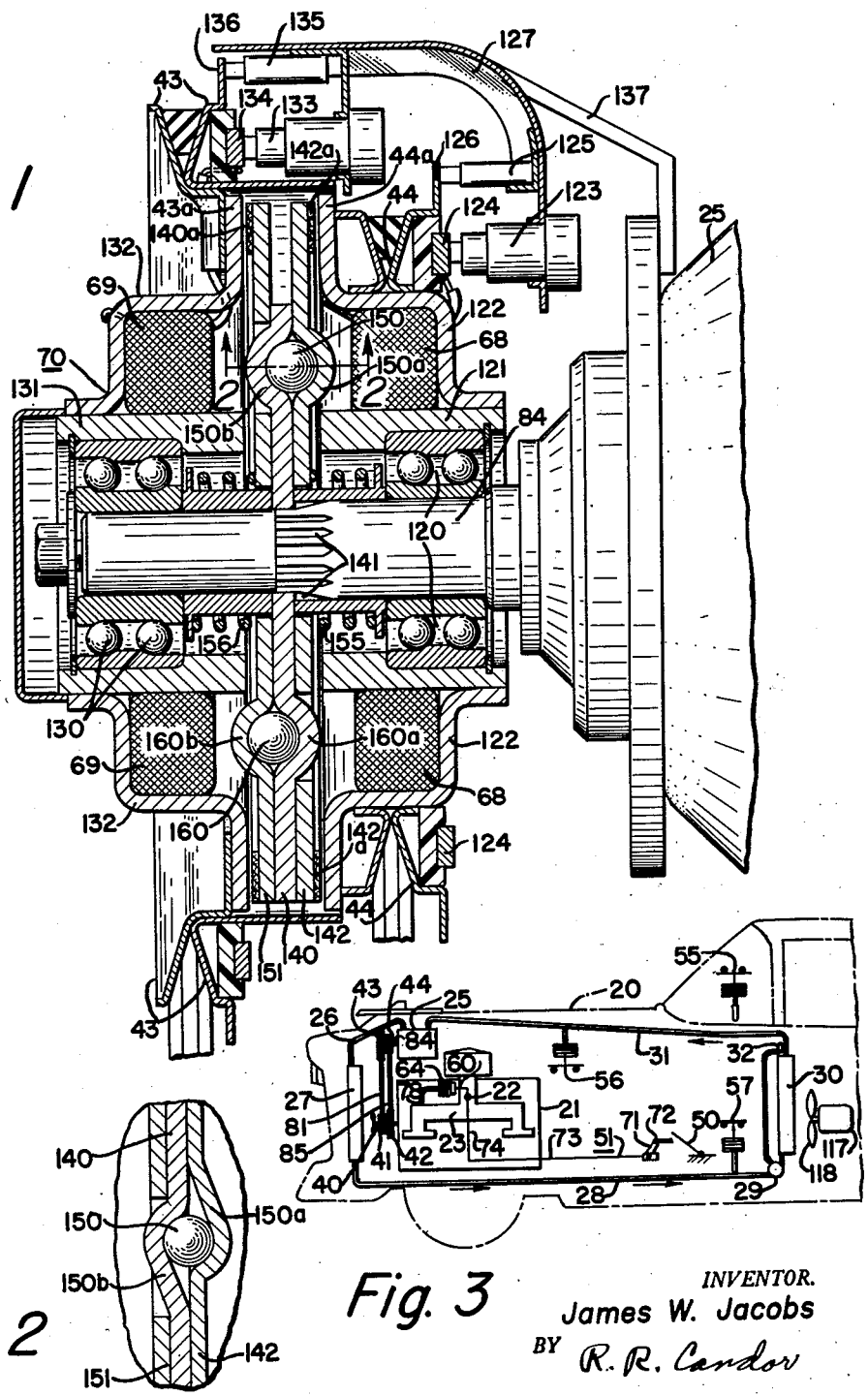
Figure 1 is a vertical cross-section of the clutch.
Figure 2 is a cross-section taken along the line 2—2 of Figure 1.
Figure 3 is a diagrammatic representation of the interior of an automobile with the air conditioning system installed therein.

Referring to Figure 3, an automobile 20 is provided with an engine 21 for driving the automobile. The engine is provided with a throttle 22 and an intake manifold 23. The engine drives a compressor 25 which sends refrigerant through a line 26 to the condenser 27. The condensed refrigerant flows through a line 28 to any type of expander, such as a thermostatic expansion valve 29, capillary tube, or the like, through an evaporator 30 and through a line 31 back to the compressor 25. The valve 29 may have a bulb 32 at the end of the evaporator. The engine has a driving shaft 40 provided with pulleys 41 and 42 which drive respectively the low speed pulley 43 and a high speed pulley 44 of the magnetic clutch to be described.

The magnetic clutch shown in Figure 1 selects which of the pulleys 43 or 44 shall drive the compressor 25. The selection of the energization of the magnetic clutch is made responsive to the position of the throttle 22 as modified by the condition of the suction in manifold 23, as shown in Figures 3 and 4. A foot pedal 50 determines the position of the throttle 22 through the action of linkage 51. A thermostatic switch 55 opens below a minimum temperature of the air in the passenger compartment of the automobile. A refrigerant back pressure switch 56 opens in response to a predetermined low refrigerant pressure in the suction side of the refrigerating system. A high side refrigerant pressure switch 57 opens above a predetermined maximum pressure on the high side of the refrigerating system. The switches 55, 56 and 57 determine whether the compressor shall be driven or not.

Figures 4 and 6 show diagrammatically the relationship of the position of the throttle 22 and the pressure in the intake manifold 23 of the engine, and how the two are coordinated to determine whether the high speed ratio or low speed ratio solenoids shall be energized.

The effect is that the engine drives the compressor at high speed ratio whenever the engine speed is below that corresponding to 60 M. P. H. (high car gear) and drives the compressor at low speed ratio whenever the engine speed is above that corresponding to 60 M. P. H. (high car gear), unless modified by the manifold, so that the compressor is not driven at destructively high speeds.

When engine is idling and pedal 50 is not depressed, the manifold suction pressure is low, and the switch is as shown in Figure 4, with the switch blade 62 closed on contact 67 which energizes the high speed ratio solenoid 68 of clutch 70 shown in Figure 1.

When the pedal is depressed suddenly to a high engine speed position corresponding to 60 M. P. H. (high car gear) for example, the manifold pressure rises because of the opening of the throttle 22 while the engine is still operating at a speed below 60 M. P. H. The rightward movement of rod 60, when the pedal is depressed, ordinarily would cause a low ratio drive of the compressor by movement of the blade 61 to the right and the switch blade 62 to the left against contact 63 which energizes the low speed ratio drive solenoid 69 for the compressor. However, the relatively high pressure in manifold 23, due to low engine speed corresponding to below 60 M. P. H. (high car gear) causes bellows 64 to push the switch box 65 (carried or moved by bellows 64) to the right, and this neutralizes the rightward movement of rod 60 to prevent compressor ratio shift until the engine speed has increased to a high speed corresponding to 60 M. P. H. When the engine speed corresponds to 60 M. P. H. (high car gear), and the pedal 50 is still depressed, the switch box 65 is pulled leftward by bellows 64, due to manifold suction pressure fall, and the blade 61 moves rightward, relatively to the box 65, and snaps switch blade 62 leftward against contact 63, which causes the compressor to be driven at the low speed ratio. This prevents destructive high speed operation of the compressor.

Further details of Figure 4 include the bell crank 71, which is fulcrumed at 72 and moves the rod 73 and also the lever 74 which is fulcrumed on the shaft 22 of the intake throttle in response to movement of pedal 50. The other end 75 of the lever 74 pushes the rod 60 longitudinally against the switch blade 61. The blade 61 is pushed rightward by spring 61a. The C spring causes the blade 62 to move counter to blade 61. The metal cup 76 is carried by a bracket 77 and is connected by the tube 78 with the intake manifold. The cup 76 carries the bellows 64 which in turn carries or moves the switch box 65 rightward or leftward to modify the action of the throttle control as heretofore described. The carburetor is diagrammatically indicated at 79.

In Figure 5, the engine is indicated diagrammatically at 21. It has a rotating shaft 40 extending therefrom which rotates in proportion to engine speed. The shaft 40 drives the pulleys 41, 42 and 80. The pulley 41 drives the V-belt 81 which passes over pulleys 82 and 83 and also over the low-speed pulley 43 of the clutch heretofore described. Whenever pulleys are indicated to be joined with a cross at the shaft junction, it is understood that the pulley is fixed to the shaft; whereas when a circle is used, it is understood that the pulley is freely rotatable on the shaft. The compressor is diagrammatically indicated at 25, with shaft 84 extending therefrom. Pulleys 43 and 44 are freely rotatable on the shaft 84. The pulley 42 drives the V-belt 85 over the pulleys 86 and 87 and over the high speed ratio pulley 44 of the clutch. The pulley 80 drives the V-belt 90 over the pulleys 91 and 92. The pulleys 83, 87 and 91 are fixed to the shaft 93 which drives the water pump 94 of the engine cooling system and also the fan 95 for cooling the engine radiatior. The pulley 92 drives the shaft 96 of the power steering pump 97. Pulleys 82 and 86 drive the shaft 98 of the generator 99.

Figure 5 also shows the structure illustrated in Figure 4 and the refrigerating system disclosed in Figure 3. The connections of the electric system are also shown in Figure 5, but the electrical connections may be more really understood by reference to Figure 6.

In Figure 6, the parts which have heretofore been described have been numbered with the same reference characters. Additionally, battery 100 may be charged from the generator 99 through the current and voltage regulator and cutout relay 101. The battery may be grounded at 102. A combined ignition and air conditioning switch 103, when closed, energizes the lines 104 and 105. The line 104 leads to the starting switch 106 which energizes the starting motor 107. The line 104 also energizes the engine ignition system 108.

Line 105 leads to a combined air conditioning and ventilation switch having simultaneously movable blades 110 and 111. When in the full line position, the switch energizes the lines 112 and 113, and both refrigeration and air circulation are provided. When in the intermediate (off) position, both lines 112 and 113 are deenergized. When the switch is in its farthest leftward position, only air circulation is provided since contact 114 is energized and this in turn energizes lines 115 and 113 leading to a rheostat 116 which controls the energization and speed of the fan motor 117. The fan 118 blows air past the evaporator 30 into the passenger compartment.

Figure 1 shows details of the two-speed ratio clutch. The compressor 25 is mounted on the engine with the pulleys 43 and 44 in alignment with the pulleys 41 and 42. The compressor 25 has a driven shaft 84. The high speed pulley 44 is freely rotatable on shaft 84 through the medium of ball bearing 120. The ball bearing 120 supports a sleeve 121. A cup 122 is mounted around the sleeve 121, and they contain the high speed solenoid 68 heretofore described between them, and form the "core" of the solenoid. The solenoid is energized through the medium of a brush 123 which contacts a ring 124 which is connected to one end of the solenoid 68. The other end of the solenoid is grounded through the compressor by a second brush 125 which contacts the ring 126 of the pulley 44. The brush 125 connects through the support 127, 137 with the compressor 25 and from thence to the automobile ground. The low speed pulley 43 is freely rotatable on the shaft 84 through the medium of ball bearing 130. Bearing 130 supports a sleeve 131 which in turn supports the cup 132. Between them they contain the low speed solenoid 69 and form the magnet core. The solenoid 69 is energized through the medium of brush 133 which contacts the ring 134 leading to one end of the solenoid 69. The other end of the solenoid 69 is grounded through the medium of the compressor 25 by another brush 135 which contacts the flange 136 of the high speed pulley 43 and is grounded through the support 127, 137 leading to the compressor 25.

A driving disk 140 is axially and rotationally fixed to the shaft 84 through the medium of splines 141. A high speed armature friction disk 142, having friction face 142a, is mounted axially and rotationally free on the driven shaft 84 between the driven disk 140 and the friction face 44a of the high speed pulley 44. High speed rotation reaction spreader driving means are placed between the friction disk 142 and the driving disk 140 locking said disks and high speed pulley 44 upon energization of the high speed solenoid 68. Such spreader means may take the form of the ball 150 and teardrop 150a and 150b construction. Three such constructions may be equally spaced around the shaft 84. A low speed armature friction disk 151 is mounted axially and rotationally free on the driven shaft 84 between the driving disks 140 and the low speed pulley 43 to be pulled in driving engagement with the low speed pulley upon energization. Disk 140 has friction face 140a, which can come into contact with pulley friction face 43a. A low speed relative rotation reaction spreader means is placed between the low speed armature friction disk 151 and the driving disk 140 locking said disks and the low speed pulley 43 into driving engagement upon the energization of the low speed solenoid 69. Such means may take the form of ball 160 and teardrop 160a and 160b construction. Three such constructions may be sandwiched between the constructions 150, 150a and 150b, as shown in Figure 2A.

Means are provided selectively to energize the solenoids 68 and 69. Such means include the switch blade 62 and the various agencies to actuate such switch blade between the contacts 63 and 67.

When the solenoids 68 and 69 are not energized, the respective armature disks are moved toward the driving disk 141 and away from the friction surfaces of the pulleys through the medium of springs 155 and 156.

Figure 7 shows a portion of Figure 6 with the intake manifold control being omitted. The figure shows only that portion of the system which is beyond the switch 110. The portion of the system which is ahead of the switch 110 is diagrammatically indicated by the square 170 (in this and other figures), and that includes such elements as the generator, starter motor, ignition system and starting switch, etc. Figure 7 shows the throttle control selecting either the high speed or the low speed solenoid without being modified by the pressure of the intake manifold, and many advantages of this invention can be derived from such a construction.

Figure 8:
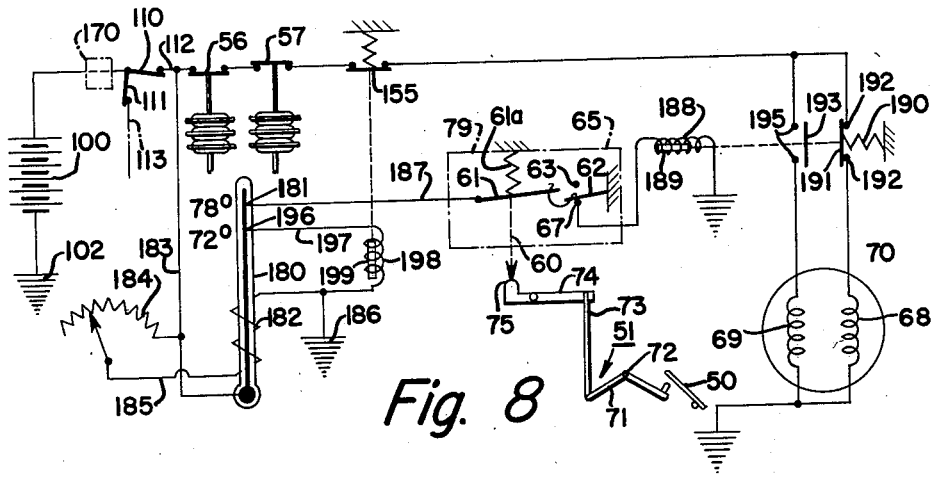
Figure 8 is a wiring diagram somewhat similar to Figure 7 but showing a modified form of thermostatic control.

Figure 8 is a view similar to Figure 7 but showing a modified form of thermostatic control. In the case of Figure 8, a mercury type of thermostat 180 is provided which causes high compressor speed to be produced when the temperature is above a maximum temperature, such as 78°, as indicated at the point 181 and low speed to be produced between 72° and 78°, or similar adjusted temperatures. The construction is such that if the temperature drops between 72° and 78°, then the compressor operates at low speed ratio regardless of the position of the throttle or other controlling agents.

To this end, the mercury thermostat 180 is heated by a heater 182 which may be calibrated to adjust the temperature to which the thermostat is sensitive. The heater 182 is heated through a line 183, rheostat 184, line 185, heater 182 and ground 186. Adjusting the rheostat 184 determines the heat generated by the heater 182 and thus the mercury thermostat 180 can be calibrated by the rheostat to be sensitive to different temperatures. If the thermostat is adjusted to 78° at the point 181, then electrical energy will flow through the line 187 whenever the temperature in the room is above 78°, but will not flow through that line when the temperature is below 78°. When current is flowing through the line 187, the clutch may be either in the high or low speed ratio but when no current is flowing through the line 187, then only the low speed ratio is possible.

When the throttle 50 is at idling speed or low speed, then the blade 61 is in upper position and the blade 62 is in contact with point 67. Then the solenoid 188 is energized and the armature 189 is moved rightward against the compression spring 190. This closes the contact 191 against contacts 192 which lead to the high speed ratio solenoid 68. When the throttle is depressed to a high speed such as 60 miles per hour, then the blade 61 moved downwardly and the blade 62 moves upwardly against the point 63 which is not connected to any element. No current can flow to the solenoid 188 and the armature 189 moves leftward by the action of the compression spring 190 moving contact 193 against the contacts 195 to energize the low speed ratio solenoid 69.

Should the passenger compartment temperature drop below 72°, corresponding to point 196 on the thermostat, then current is cut off from the line 197 and the solenoid 198 is deenergized. The armature 199 drops downward and opens the switch 155 and thus deenergizes both solenoids of the clutch 70, and the compressor is not driven since no refrigeration is required.

Figure 9:
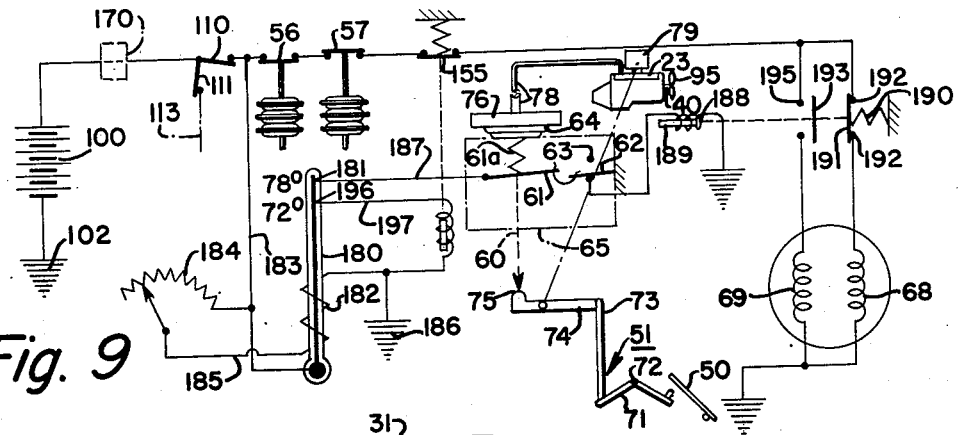
Figure 9 is a view similar to Figure 6 but showing a modified form of thermostatic control.

Figure 9 is a view similar to Figure 8, and all of the actions are the same except that the action of the throttle pedal 50 is modified by the suction manifold 23 in the same manner as previously described with regard to Figures 4 and 6. Otherwise, the action is exactly the same as in Figure 8.

Figure 10:
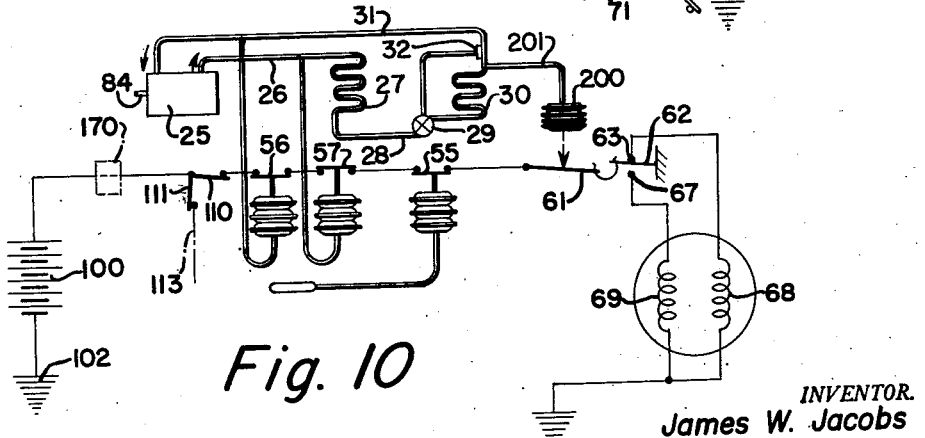
Figure 10 is a view similar to a portion of Figure 6 modified by providing a control response to a condition of the refrigerating system.

Figure 10 shows selection of speed ratio in accordance with a refrigerant condition such as the pressure on the suction side of the refrigerating system. The electric line is substantially the same as in Figures 6 and 7 except that the blade 61 is controlled by the back pressure of the refrigerating system. A bellows 200 is connected by the line 201 to the low side of the refrigerating system. Whenever the pressure on the low side is unduly high, the bellows 200 expands and pushes the blade 61 downward, thus causing the blade 62 to move upward against the contact 63. This energizes the high speed solenoid 68. When the refrigerant pressure has been reduced to normal working conditions, the bellows 200 contracts and moves the blade 61 upward, and the blade 63 downward, against the contact 67. The low speed solenoid 69 is energized.

The control may be made by use of any other refrigerant condition in the system or other condition on the vehicle that may be desired to produce the selection of speed ratio.

While the form of embodiment of the invention as herein disclosed constitutes a preferred form, it is to be understood that other forms might be adopted as may come within the scope of the claims which follow.

What is claimed is as follows:

1. In combination: a vehicle, an engine driving said vehicle; a vehicle space to be cooled on said vehicle; a refrigerating system on said vehicle and including a compressor, condenser and evaporator in refrigerant flow relationship, with said evaporator cooling said vehicle space; compressor driving means between said engine and said compressor; a multiple speed ratio drive clutch on said compressor driving means; a throttle controlling said engine; a manifold on said engine; and means responsive to different combined relationships of conditions of said throttle and conditions in said manifold selectively causing different speed ratio drives in said clutch.

2. In combination: a vehicle, an engine driving said vehicle; a vehicle spaced to be cooled on said vehicle; a refrigerating system on said vehicle and including a compressor, condenser and evaporator in refrigerant flow relationship, with said evaporator cooling said vehicle space; compressor driving means between said engine and said compressor; a multiple speed ratio drive clutch on said compressor driving means; a plurality of solenoids selectively causing different speed ratio drives in said clutch; a throttle controlling said engine; a manifold on said engine; and means responsive to different combined relationships of conditions of said throttle and conditions in said manifold selectively causing different speed ratio drives in said clutch.

3. In combination: a vehicle, an engine driving said vehicle; a vehicle space to be cooled on said vehicle; a refrigerating system on said vehicle and including a compressor, condenser and evaporator in refrigerant flow relationship, with said evaporator cooling said vehicle space; compressor driving means between said engine and said compressor; a multiple speed ratio drive clutch on said compressor driving means; a manifold on said engine; means responsive to different conditions in said manifold selectively causing different speed ratio drives in said clutch; and means responsive to air conditions in said vehicle space controlling the operation of said compressor.

4. In combination: a vehicle, an engine driving said vehicle; a vehicle space to be cooled on said vehicle; a refrigerating system on said vehicle and including a compressor, condenser and evaporator in refrigerant flow relationship, with said evaporator cooling said vehicle space; compressor driving means between said engine and said compressor; a multiple speed ratio drive clutch on said compressor driving means; a throttle controlling said engine; a manifold on said engine; means responsive to different combined relationships of conditions of said throttle and conditions in said manifold selectively causing different speed ratio drives in said clutch; and means responsive to air conditions in said vehicle space controlling the operation of said compressor.

5. In combination: a vehicle; an engine driving said vehicle and having an engine drive shaft; a vehicle space to be cooled; a refrigerating system on said vehicle and including a compressor, condenser and evaporator in refrigerant flow relationship with said evaporator cooling said vehicle space; a compressor shaft rotatable for operating said compressor; a clutch on said compressor shaft having a high speed clutch pulley and a low speed clutch pulley both freely rotatable on said compressor shaft; belting between said pulleys and engine drive shaft; a clutch driven member fixed on said compressor shaft; a high speed clutch driving member engageable with said high speed clutch pulley and said clutch driven member; a high speed clutch solenoid causing driving engagement between said high speed clutch pulley, high speed clutch driving member and said clutch driven member; a low speed clutch driving member engageable with said low speed clutch pulley and said clutch driven member; a low speed clutch solenoid causing driving engagement between said low speed clutch pulley, low speed clutch driving member and said clutch driven member; an electric source on said vehicle for said solenoids; a manifold on said engine; means responsive to different conditions in said manifold selectively connecting different solenoids to said electric source; and means responsive to air conditions in said vehicle space controlling the operation of said compressor.

6. In combination: a vehicle; an engine driving said vehicle and having an engine drive shaft; a vehicle space to be cooled; a refrigerating system on said vehicle and including a compressor, condenser and evaporator in refrigerant flow relationship with said evaporator cooling said vehicle space; a compressor shaft rotatable for operating said compressor; a clutch on said compressor shaft having a high speed clutch pulley and a low speed clutch pulley both freely rotatable on said compressor shaft; belting between said pulleys and engine drive shaft; a clutch driven member fixed on said compressor shaft; a high speed clutch driving member engageable with said high speed clutch pulley and said clutch driven member; a high speed clutch solenoid causing driving engagement between said high speed clutch pulley, high speed clutch driving member and said clutch driven member; a low speed clutch driving member engageable with said low speed clutch pulley and said clutch driven member; a low speed clutch solenoid causing driving engagement between said low speed clutch pulley, low speed clutch driving member and said clutch driven member; an electric source on said vehicle for said solenoids; a throttle controlling said engine; a manifold on said engine; means responsive to different combined relationships of conditions of said throttle and conditions in said manifold selectively connecting different solenoids to said electric source; and means responsive to air conditions in said vehicle space controlling the operation of said compressor.

7. In combination: a vehicle, an engine driving said vehicle; a vehicle space to be cooled on said vehicle; a refrigerating system on said vehicle and including a compressor, condenser and evaporator in refrigerant flow relationship, with said evaporator cooling said vehicle space; compressor driving means between said engine and said compressor; a multiple speed ratio drive clutch on said compressor driving means; a manifold on said engine; means responsive to different conditions in said manifold selectively causing different speed ratio drives in said clutch; and means responsive to refrigerant conditions controlling the operation of said compressor.

8. In combination: a vehicle, an engine driving said vehicle; a vehicle spaced to be cooled on said vehicle; a refrigerating system on said vehicle and including a compressor, condenser and evaporator in refrigerant flow relationship, with said evaporator cooling said vehicle space; compressor driving means between said engine and said compressor; a multiple speed ratio drive clutch on said compressor driving means; a throttle controlling said engine; a manifold on said engine; means responsive to different combined relationships of conditions of said throttle and conditions in said manifold selectively causing different speed ratio drives in said clutch; and means responsive to refrigerant conditions controlling the operation of said compressor.

9. In combination, a vehicle, an internal combustion engine driving said vehicle, said engine having an inlet manifold provided with a throttle, a multi-speed drive means driven by said engine, a high and lower speed control for said drive means including pressure responsive means responsive to increasing vacuum in said manifold and mechanical means operably connected to said throttle and responsive to a partly closed position of said throttle for moving said drive means to a high speed drive, said pressure responsive means being responsive to decreasing vacuum in said manifold and said mechanical means being responsive to a more fully open position of said throttle for moving said drive means to a low speed drive.

References Cited in the file of this patent

UNITED STATES PATENTS

| | | |
|---|---|---|
| 2,094,449 | Forichon | Sept. 28, 1937 |
| 2,264,821 | Zukoski | Dec. 2, 1941 |
| 2,284,914 | Miller | June 2, 1942 |
| 2,344,864 | Griswold | Mar. 21, 1944 |
| 2,367,306 | Newton | Jan. 16, 1945 |
| 2,416,154 | Chilton | Feb. 18, 1947 |
| 2,449,888 | Edwards | Sept. 21, 1948 |
| 2,495,350 | Smith | Jan. 24, 1950 |
| 2,649,941 | Doebeli | Aug. 25, 1953 |
| 2,658,593 | Doebeli | Nov. 10, 1953 |
| 2,720,087 | Groene | Oct. 11, 1955 |